No. 686,430. Patented Nov. 12, 1901.
H. B. WILLIAMS.
FERTILIZER DISTRIBUTER ATTACHMENT FOR CULTIVATORS.
(Application filed Mar. 19, 1901.)
(No Model.)
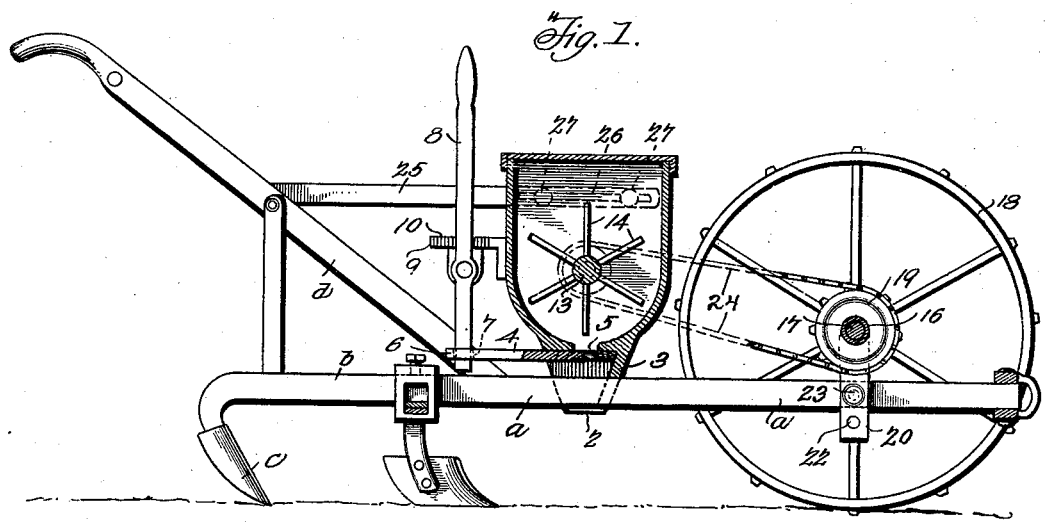
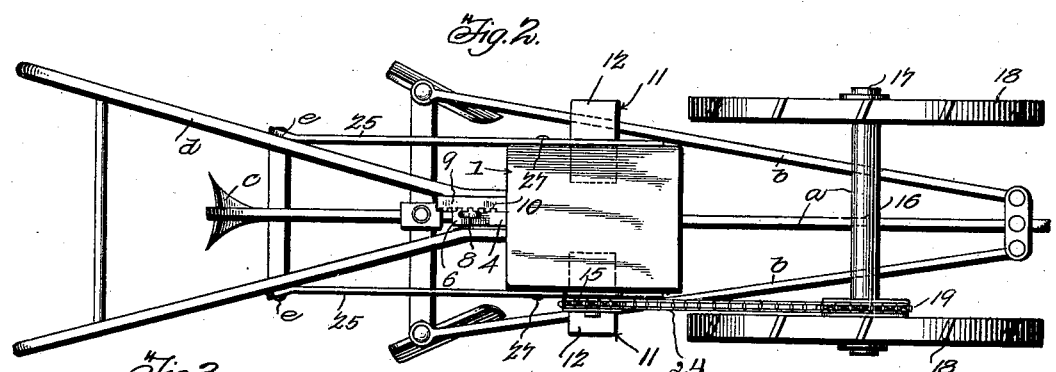
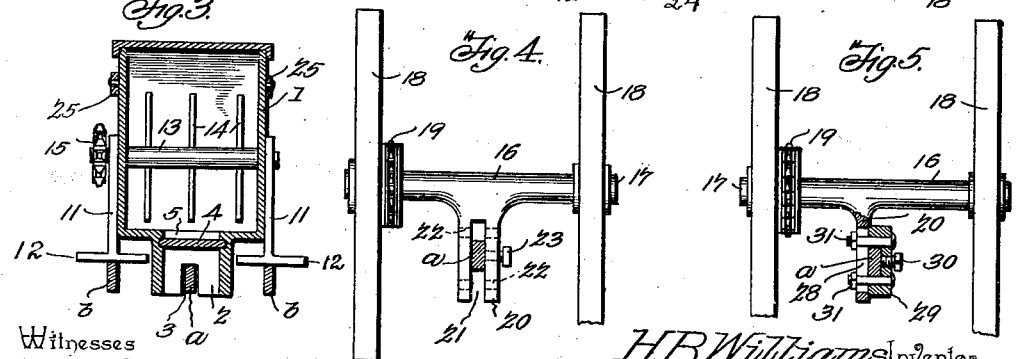
Witnesses
H. B. Williams, Inventor
By C. A. Snow & Co.
Attorneys

UNITED STATES PATENT OFFICE.

HUGH B. WILLIAMS, OF NEWVILLE, VIRGINIA.

FERTILIZER-DISTRIBUTER ATTACHMENT FOR CULTIVATORS.

SPECIFICATION forming part of Letters Patent No. 686,430, dated November 12, 1901.

Application filed March 19, 1901. Serial No. 51,926. (No model.)

*To all whom it may concern:*

Be it known that I, HUGH B. WILLIAMS, a citizen of the United States, residing at Newville, in the county of Prince George and State of Virginia, have invented a new and useful Fertilizer-Distributer Attachment for Cultivators, of which the following is a specification.

My invention is an improved fertilizer-distributer attachment for cultivators, the object of my invention being to provide a novel and simple apparatus which is adapted to be readily attached to and used in connection with a cultivator of usual form for opening furrows and distributing fertilizer therein prior to planting.

My invention consists in the peculiar construction and combination of devices hereinafter fully set forth and claimed.

In the accompanying drawings, Figure 1 is a sectional view of a fertilizer-distributer attachment embodying my improvements, showing the same arranged in operative position on a three-beam cultivator. Fig. 2 is a top plan view of the same. Fig. 3 is a transverse sectional view taken through the fertilizer-hopper and showing the same disposed in operative relation to the beams of the cultivator. Fig. 4 is a detail view showing the bearing for the driving-shaft attached to the center beam of the cultivator. Fig. 5 is a similar view showing a modification.

In the embodiment of my invention I provide a fertilizer-hopper 1, which may be of any suitable form and size and is provided on its lower side with a vertical discharge-spout 2, the rear side of which is open and the front side of which is provided with a vertical slot 3, open on its lower side, which slot adapts the discharge-spout to be disposed on and astride of the center beam $a$ of a cultivator of the usual form, known as a "three-beam" cultivator. In the said discharge-spout 2 is a cut-off or slide 4, which is disposed under the discharge-opening 5 in the bottom of the hopper and may be adjusted to open or uncover said opening to any desired extent, and thereby control and predetermine the quantity of fertilizer discharged from the hopper, and said slide or cut-off may be used to entirely close the opening 5 to pretermit the operation of the machine. Said slide or cut-off has an arm 6 extending therefrom, which arm is provided with an opening 7, which receives the lower end of a shifting lever 8. The latter is a spring-bar and is fulcrumed to a bracket 9, which bracket may be disposed and secured on either the front side or the rear side of the hopper. In the drawings the bracket is shown on the rear side of the hopper. Said bracket has a locking-rack 10, which is engaged by the spring-lever 8 and serves to lock the latter, and hence the slide or cut-off, in any desired position.

On the sides of the hopper are detachably bolted standards 11, at the lower ends of which are horizontally disposed feet 12, which extend laterally in both directions from the said standards, the said feet bearing on the adjustable side beam $b$ of the cultivator, and the width of the said feet being such that the same will bear on the said side beams $b$ at all practical adjustments of the latter. A shaft 13 is journaled in bearings in the sides of the hopper 1 and in the standards 11. Said shaft is provided with radial stirring-arms 14, which revolve in the hopper, and at one end of the said shaft on one side of said hopper is a sprocket-wheel 15. It will be understood that the said shaft 13 being revolved the stirring-arms 14 will serve to agitate and stir the fertilizer in the hopper and cause the same to be discharged from the hopper into the furrow. The plate or shovel $c$, which is carried by the center beam $a$, operates in the furrow and mixes the fertilizer with the soil therewith.

In a sleeve-bearing 16 is journaled a shaft 17. On the ends of the latter are secured traction-wheels 18 of suitable size. A sprocket-wheel 19 revolves with one of said traction-wheels. The said sleeve-bearing 16 is provided at its center with a depending vertical arm 20, which is provided with a vertical slot 21, that is open on its lower side. Thereby said arm is bifurcated to form a fork and adapted to be fitted on the center beam $a$ of the cultivator, as shown in Fig. 4. The said vertical arm 20 has adjusting-openings 22, and a set-screw 23 is provided and adapted to operate in either of said adjusting-openings, the latter serving to clamp the said bearing to said center beam and admit of the vertical adjustment of said bearing thereon.

It will be understood that said bearing may be readily attached to and detached from said center beam. An endless sprocket-chain 24 connects the sprocket-wheels 15 and 19 and conveys power from one of said traction-wheels to the shaft 13, as will be understood.

I provide a pair of metallic straps 25, which at their rear ends may be readily bolted to the handles $d$ of the cultivator, as at $e$, or detached therefrom, and said straps bear against opposite sides of the hopper and are provided with slots 26, (shown in dotted lines in Fig. 1,) and suitable set-screws or bolts 27 connect the said straps to the sides of the hopper and extend through said slots 26, the latter admitting of the longitudinal adjustment of the hopper on the beams of the cultivator, as may be desirable.

In Fig. 5 of the drawings I show a modified form of the sleeve-bearing 16, in which I provide the vertical arm 20 thereof with a vertical slot 28 and provide a clip 29, which bears against one side of center beam $a$, said standard 20 bearing against the opposite side thereof, said clip being secured on said beam by a set-screw 30 and being secured to said arm or standard 20 by bolts 31, which operate in the vertical slot 28, and hence adapts said sleeve-bearing to be vertically adjusted with relation to the beam $a$, as will be understood.

Having thus described my invention, I claim—

1. A fertilizer-distributer attachment for cultivators, comprising a hopper, means to detachably secure the same on the beams of the cultivator and admit of the lateral adjustment of the side beams of the latter, a bearing having means to detachably secure the same on the center beam of a cultivator, a shaft in said bearing, having traction-wheels, a stirring mechanism in the hopper and means to convey power thereto from one of said wheels, substantially as described.

2. In a fertilizer-distributer attachment of the class described, a hopper having means on its lower side to engage the center beam of a cultivator and standards provided with laterally-extended feet adapted to bear on the adjustable side beams of a cultivator, substantially as described.

3. In a fertilizer-distributer of the class described, a hopper having means to detachably secure the same on the beams of a cultivator and admit of the lateral adjustment of the side beams of the cultivator and straps adapted to be attached to the handles of the cultivator and to the sides of said hopper, substantially as described.

4. In a fertilizer-distributer attachment of the class described, in combination with a hopper having means to secure the same on a cultivator and provided with a revoluble stirring-shaft, a bearing having a vertical arm and means to adjustably secure the same to the center beam of a cultivator, traction-wheels having their shafts journaled in said bearing and connections between one of said traction-wheels and the stirring-shaft of the hopper, substantially as described.

5. In a fertilizer-distributer attachment of the class described, a hopper having a depending discharge-spout on its lower side provided with an open-ended slot 3 to receive the center beam of a cultivator, and standards provided with laterally-extended feet, adapted to bear on the laterally-adjustable side beams of the cultivator, substantially as described.

In testimony that I claim the foregoing as my own I have hereto affixed my signature in the presence of two witnesses.

HUGH B. WILLIAMS.

Witnesses:
W. P. BAIRD,
F. B. McCANN.